US012705505B2

(12) United States Patent
Yoshikawa

(10) Patent No.: US 12,705,505 B2
(45) Date of Patent: Aug. 11, 2026

(54) COMPUTER-READABLE RECORDING MEDIUM HAVING STORED THEREIN VECTOR ESTIMATING PROGRAM, APPARATUS FOR ESTIMATING VECTOR, AND METHOD FOR ESTIMATING VECTOR

(71) Applicant: FUJITSU LIMITED, Kawasaki (JP)

(72) Inventor: Hiyori Yoshikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1314 days.

(21) Appl. No.: 17/492,934

(22) Filed: Oct. 4, 2021

(65) Prior Publication Data

US 2022/0207381 A1 Jun. 30, 2022

(30) Foreign Application Priority Data

Dec. 25, 2020 (JP) ................................ 2020-216980

(51) Int. Cl.

| | |
|---|---|
| ***G06N 5/022*** | (2023.01) |
| ***G06F 9/30*** | (2018.01) |
| ***G06F 16/901*** | (2019.01) |
| ***G06F 16/906*** | (2019.01) |
| ***G06N 20/00*** | (2019.01) |

(52) U.S. Cl.
CPC ......... *G06N 5/022* (2013.01); *G06F 9/30036* (2013.01); *G06F 16/9024* (2019.01); *G06F 16/906* (2019.01); *G06N 20/00* (2019.01)

(58) Field of Classification Search
CPC ...... G06N 5/022; G06N 20/00; G06F 16/906; G06F 16/9024; G06F 9/30036
See application file for complete search history.

(56) References Cited

U.S. PATENT DOCUMENTS

| | | | |
|---|---|---|---|
| 10,157,226 | B1 | 12/2018 | Costabello et al. |
| 2019/0095806 | A1 | 3/2019 | Martinez Canedo et al. |

OTHER PUBLICATIONS

Hamaguchi, Takuo, et al. “Knowledge transfer for out-of-knowledge-base entities: A graph neural network approach.” arXiv preprint arXiv:1706.05674 (2017). (Year: 2017).*

(Continued)

*Primary Examiner* — Miranda M Huang
(74) *Attorney, Agent, or Firm* — Fujitsu Intellectual Property Center

(57) ABSTRACT

A non-transitory computer-readable recording medium has stored therein a vector estimating program that causes a computer to execute a process including: obtaining a first vector and second entity information, the first vector being generated by using a first model with reference to graph structure data representing a relationship of a first entity group and being obtained by using first entity information related to the first entity group, the second entity information obtained by updating the first entity information and related to the first entity group and a second entity not being included in the first entity group; generating a second model based on the first vector and information on the first entity group included in the second entity information, the second model being used for obtaining vector data from the second entity information; and estimating a second vector corresponding to the second entity by using the generated second model.

9 Claims, 10 Drawing Sheets

(56) References Cited

OTHER PUBLICATIONS

Wang, Peifeng, et al. "Logic attention based neighborhood aggregation for inductive knowledge graph embedding." Proceedings of the AAAI Conference on Artificial Intelligence. vol. 33. No. 01. 2019. (Year: 2019).*

Takuo Hamaguchi et al., "Knowledge Transfer for Out-of-Knowledge-Base Entities: A Graph Neural Network Approach", Proceeding of the Twenty-Sixth International Joint Conference on Artificial Intelligence(IJCAI-17). (Total 7 pages).

Peifeng Wang et al., "Logic Attention Based Neighborhood Aggregation for Inductive Knowledge Graph Embedding", The Thirty-Third AAAI Conference on Artificial Intelligence (AAAI-19). (Total 8 pages).

Hyun-Je Song et al., "Enriching Translation-Based Knowledge Graph Embeddings Through Continual Learning", IEEE Access, Digital Object Identifier: 10.1109/ACCESS.2018.2874656, Oct. 9, 2018. (Total 9 pages).

* cited by examiner

10
COMPUTER
10a
PROCESSOR
10c
STORING DEVICE
10e
IO DEVICE
10i
10b
MEMORY
10d
IF DEVICE
10f
READER
10h
10c
STORING DEVICE
10g
PROGRAM

COMPUTER-READABLE RECORDING MEDIUM HAVING STORED THEREIN VECTOR ESTIMATING PROGRAM, APPARATUS FOR ESTIMATING VECTOR, AND METHOD FOR ESTIMATING VECTOR

CROSS-REFERENCE TO RELATED APPLICATION

This application is based upon and claims the benefit of priority of the prior Japanese Patent application No. 2020-216980, filed on Dec. 25, 2020, the entire contents of which are incorporated herein by reference.

FIELD

The embodiment discussed herein is directed to a computer-readable recording medium having stored therein a vector estimating program, an apparatus for estimating a vector, and a method for estimating a vector.

BACKGROUND

An Artificial Intelligence (AI) task that makes knowledge-based determination has been known. Examples of application of such an AI task include, for example, knowledge supplementation and link estimation that estimate likelihood of unknown facts, entity classification that estimates categories to which target facts belong, and question-and-answer based on knowledge search.

Knowledge may be expressed, for example, by embedding the knowledge into a Knowledge Graph (KG). A KG is an example of a Knowledge Base (KB) obtained by collecting information from a variety of sources.

The KG may be of a graph expression, i.e., graph structure data, including multiple entities (may be referred to as an "entity group") representing multiple knowledge, which is exemplified by multiple nodes, and a relationship of these nodes, which relationship is referred to as an edge, for example.

Embedding of a KG for the purpose of expressing knowledge is to express an entity on the KG in a lower-dimension vector, and the vector may be referred to as a "KG embedding vector", an "embedding vector", or simply a "vector". The embedding of a KG is obtained by machine learning based on the structure information of the KG, and may be used for various estimation.

[Patent Document 1] U.S. Pat. No. 10,157,226

SUMMARY

According to an aspect of the embodiments, a non-transitory computer-readable recording medium has stored therein a vector estimating program that causes a computer to execute a process including: obtaining a first vector and second entity information, the first vector being generated by using a first model with reference to graph structure data, the graph structure data representing a relationship of a first entity group and being obtained by using first entity information related to the first entity group, the second entity information being obtained by updating the first entity information and being related to the first entity group and a second entity not being included in the first entity group; generating a second model based on the first vector and information on the first entity group included in the second entity information, the second model being used for obtaining vector data from the second entity information; and estimating a second vector corresponding to the second entity by using the generated second model.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Figure 1:
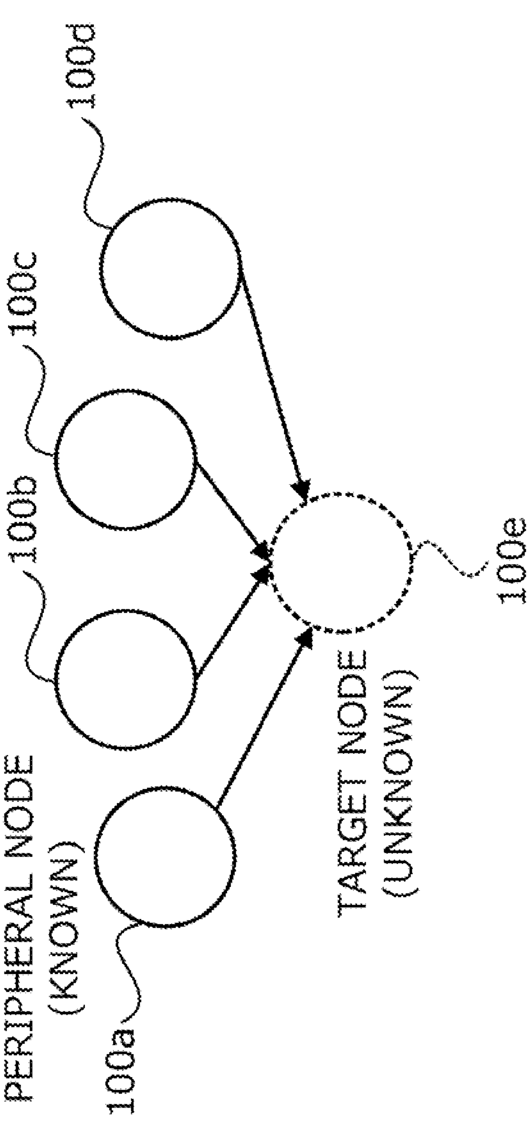
FIG. 1 is a diagram illustrating an example of a first scheme.

The KG is updated on the basis of new knowledge. However, it is impractical to perform machine learning of a KG embedding model to obtain a KG embedding vector each time the KG is updated. In most cases, machine learning of a KG embedding model is performed, considering the structure of the entire graph, which sometimes makes it difficult to perform machine re-learning on part of the graph.

Hereinafter, an embodiment of the present invention will now be described with reference to the accompanying drawings. However, the embodiment described below is merely illustrative and there is no intention to exclude the application of various modifications and techniques that are not explicitly described below. For example, the present embodiment can be variously modified and implemented without departing from the scope thereof. In the drawings to be used in the following description, like reference numbers denote the same or similar parts, unless otherwise specified.

<1> One Embodiment

As an example of a scheme of obtaining a vector related to an entity not existing at a time of machine learning, a first scheme that integrates peripheral nodes is provided.

FIG. 1 is a diagram illustrating an example of the first scheme. As illustrated in FIG. 1, in machine learning of a KG embedding model, a computer performs machine learning of a model including a mechanism that calculates a vector of an unknown target node 100*e* by integrating KG embedding vectors of known peripheral nodes 100*a* to 100*d*.

According to the first scheme, even if the vector of the target node 100*e* does not exist at the time of the machine learning of the model, the computer can calculate the vector of the target node 100*e* by integrating the vectors of the peripheral nodes 100*a* to 100*d*. The first scheme may be implemented, for example, by one or both of the schemes described in "Knowledge Transfer for Out-of-Knowledge-Base Entities: A Graph Neural Network Approach, Takuo Hamaguchi et al., IJCAI 2017" and "Logic Attention Based Neighborhood Aggregation for Inductive Knowledge Graph Embedding, Peifeng Wang et al., AAAI 2019".

Furthermore, as an example of a scheme of obtaining a vector related to an entity not existing at a time of machine learning, a second scheme that performs machine re-learning of the model is provided.

In the second scheme, the computer performs machine re-learning of the KG embedding model as the graphs are updated. The second scheme may be implemented, for example, by the scheme described in "Enriching Translation-Based Knowledge Graph Embeddings Through Continual Learning, Hyun-Je Song et al., IEEE Access 2018, October 2018".

The first and second schemes described above are premised on the following (a) and (b).

(a) The computer performs machine learning based on a model corresponding to updating of a KG. In other words, the computer uses a model that considers integration of nodes when performing the original embedding machine learning.

Figure 2:
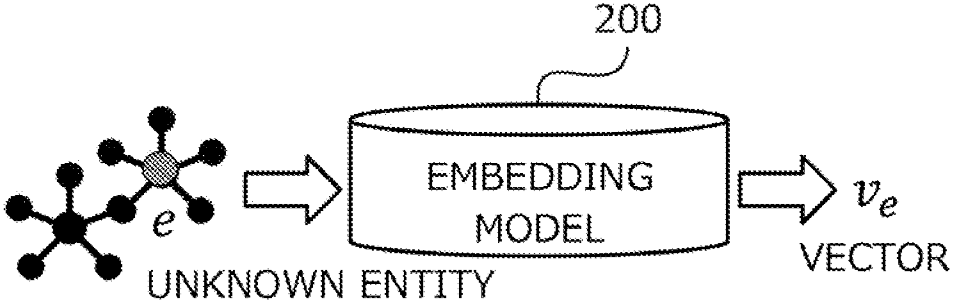
FIG. 2 is a diagram illustrating an example of a premise (b) of the first and second schemes.

(b) As illustrated in FIG. 2, the computer can access an embedding model 200 at the time of machine learning when calculating a vector ve of a new entity e.

However, in the following cases (A) or (B), the first and second schemes described above may sometimes have difficulty in obtaining the vector of the entity that does not exist at the time of the machine learning.

(A) In the above case (a), the machine-learned KG embedding model does not consider updating of the KG.

An example of a model frequently used is embedding of a static graph such as TransE. Accordingly, in cases where the original model does not support dynamic updating of the graph, the original embedding model, which is however of high quality, sometimes has a difficulty in being extended to an unknown entity.

Figure 3:
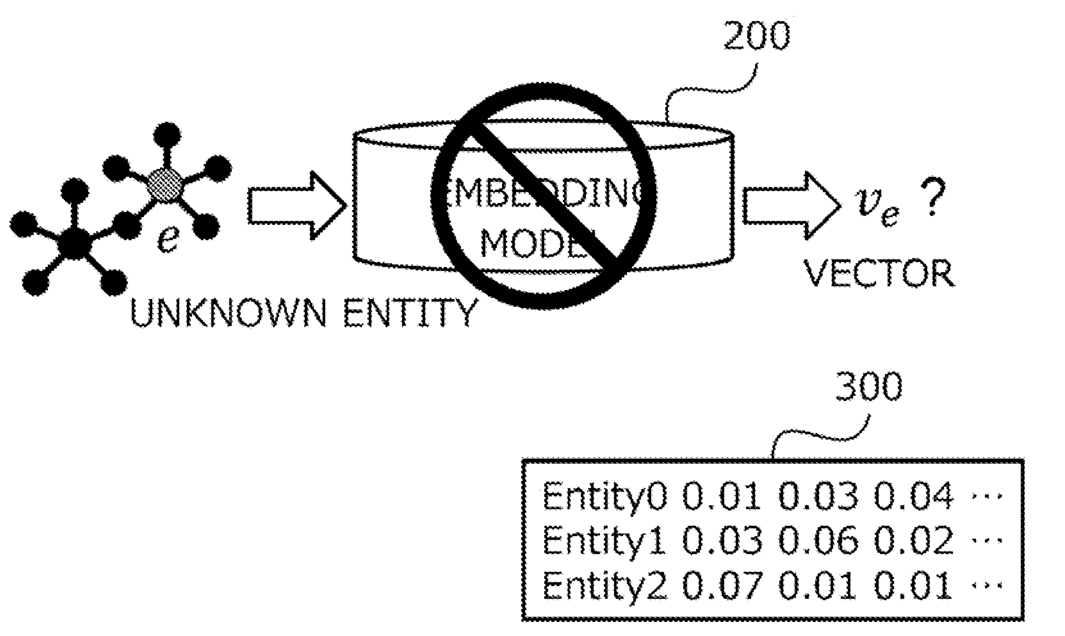
FIG. 3 is a diagram illustrating an example of a case where it is difficult to obtain a vector of an entity not existing at a time of machine learning.

(B) As illustrated in FIG. 3, the embedding model 200 is inaccessible at the time of machine learning when the vector ve of the new entity e is being calculated.

An example of the above (B) is a case where only machine-learned vectors 300, not the machine-learned model 200, are distributed.

Therefore, the computer according to one embodiment performs machine learning of a model that estimates a new embedding vector based on embedding vector information related to an existing graph, and estimates the new embedding vector by using the model.

Figure 4:
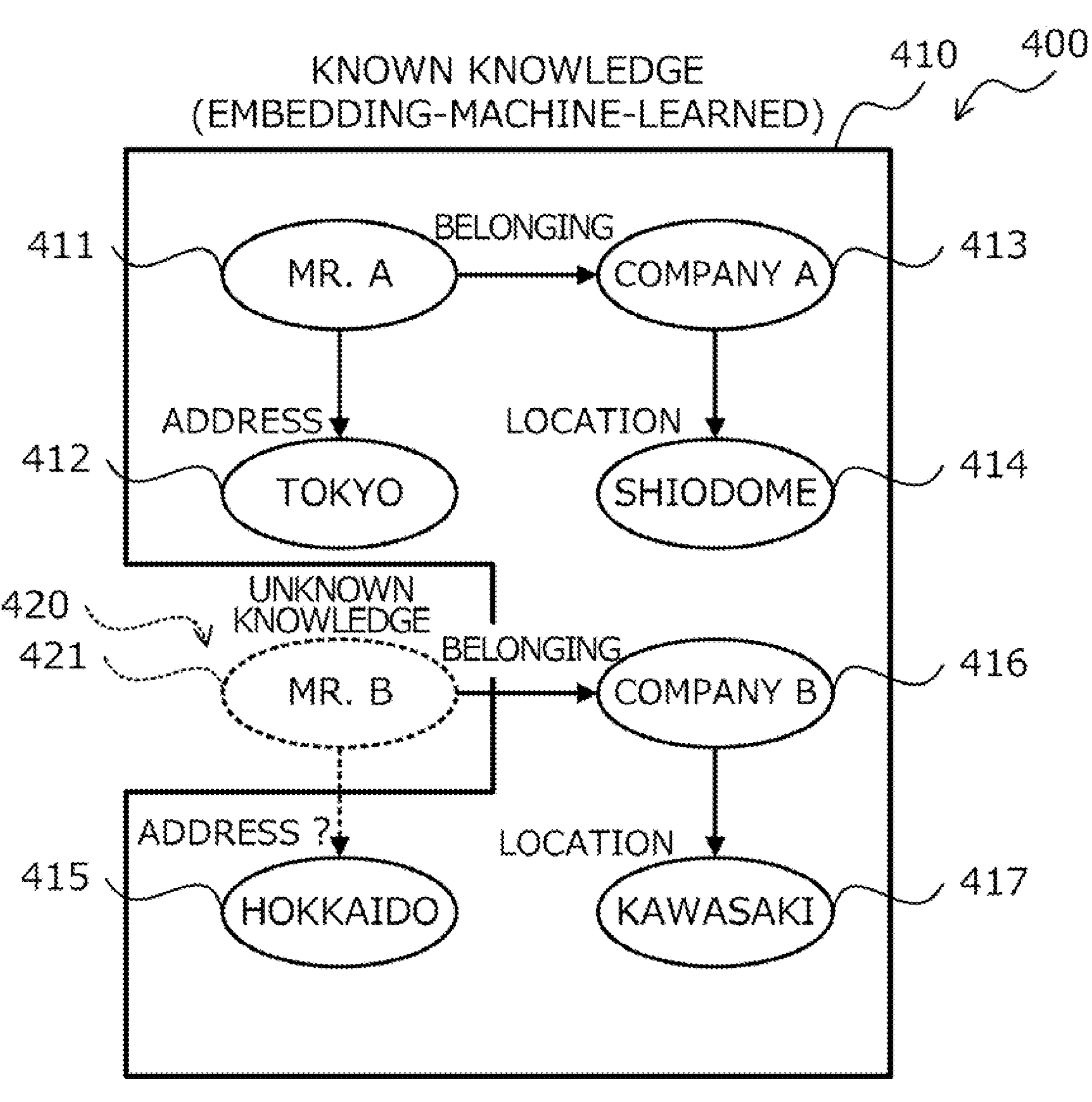
FIG. 4 is a diagram illustrating an example of a knowledge graph (KG)

FIG. 4 is a diagram illustrating an example of a KG 400. As illustrated in FIG. 4, in the KG 400 expressing an embedding-machine-learned known knowledge 410, it is assumed that the address of a node 411 (Mr. A) indicates a node 412 (Tokyo), the belonging of the node 411 indicates a node 413 (Company A), and the location of the node 413 indicates a node 414 (Shiodome). In the KG 400, a node 415 (Hokkaido) indicating an address and a node 416 (Company B) indicating belonging are presented, and the location of the node 416 indicates a node 417 (Kawasaki).

For example, in the one embodiment, description will now be made in relation to a scheme of calculating an embedding vector of an entity (e.g., a node 421 (Mr. B) being unknown knowledge 420) that do not exist at the time of machine learning while suppressing machine re-learning of the entire KG 400. This makes it possible to estimate the embedding vector for the unknown knowledge 420, so that the estimated embedding vector can be used for various inferences in the AI task, such as knowledge supplementation, link estimation, entity classification, and question-and-answer.

<1-1> Description of Server of One Embodiment

Figure 5:
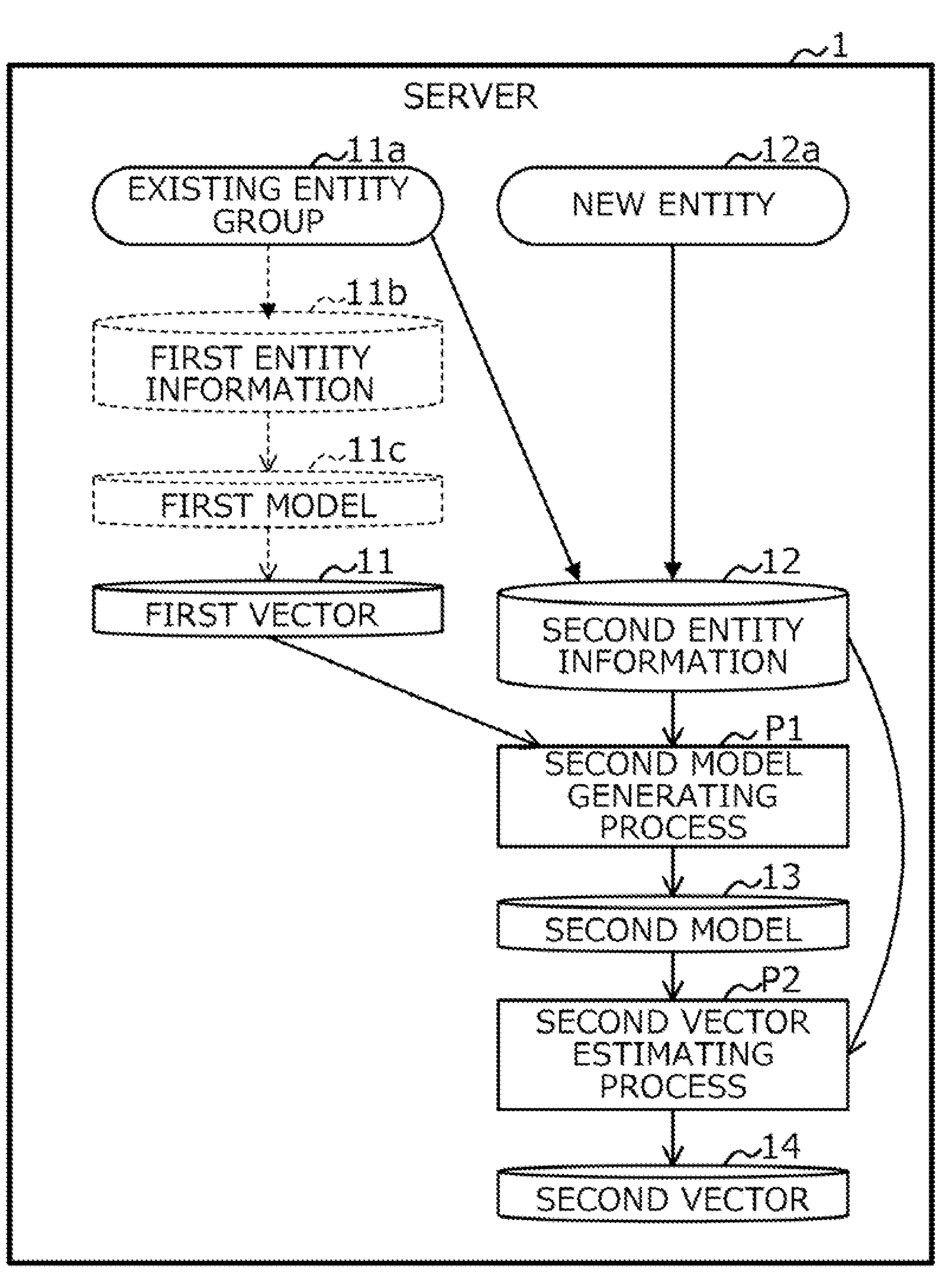
FIG. 5 is a diagram illustrating an example of a process performed by a server according to one embodiment.

FIG. 5 is a diagram illustrating an example of a process performed by a server 1 according to the one embodiment. The server 1 is an example of an information processing apparatus or a computer. As illustrated in FIG. 5, the server 1 of the one embodiment may execute the following processes (1) to (3).

(1) The server 1 may obtain a first vector 11 and second entity information 12.

The first vector 11 may be generated by using a first model 11*c* with reference to graph structure data representing a relationship of a first (existing) entity group 11*a* obtained by using first entity information 11*b* related to the first entity group 11*a*. For example, the first vector 11 may be generated by the server 1, or may be provided from the outside of the server 1, such as a computer other than the server 1.

The second entity information 12 is obtained by updating the first entity information 11*b*. The second entity information 12 may be entity information on an updated version of the first entity information 11*b* and may be entity information related to the first entity group 11*a* and a second (new) entity 12*a* not included in the first entity group 11*a*.

(2) The server 1 may execute a second model generating process P1 that generates a second model 13 for obtaining vector data from the second entity information 12 on the basis of the first vector 11 and the information on the first entity group included in the second entity information 12.

(3) The server 1 may perform a second vector estimating process P2 that estimates a second vector 14 corresponding to the second entity 12*a* by using the generated second model 13.

Consequently, the server 1 can estimate the second vector 14 corresponding to the second entity 12*a* from the first vector 11 generated by using the first model 11*c* on the basis of the graph structure data representing the relationship of the first entity group 11*a*.

<1-2> Example of Functional Configuration

Figure 6:
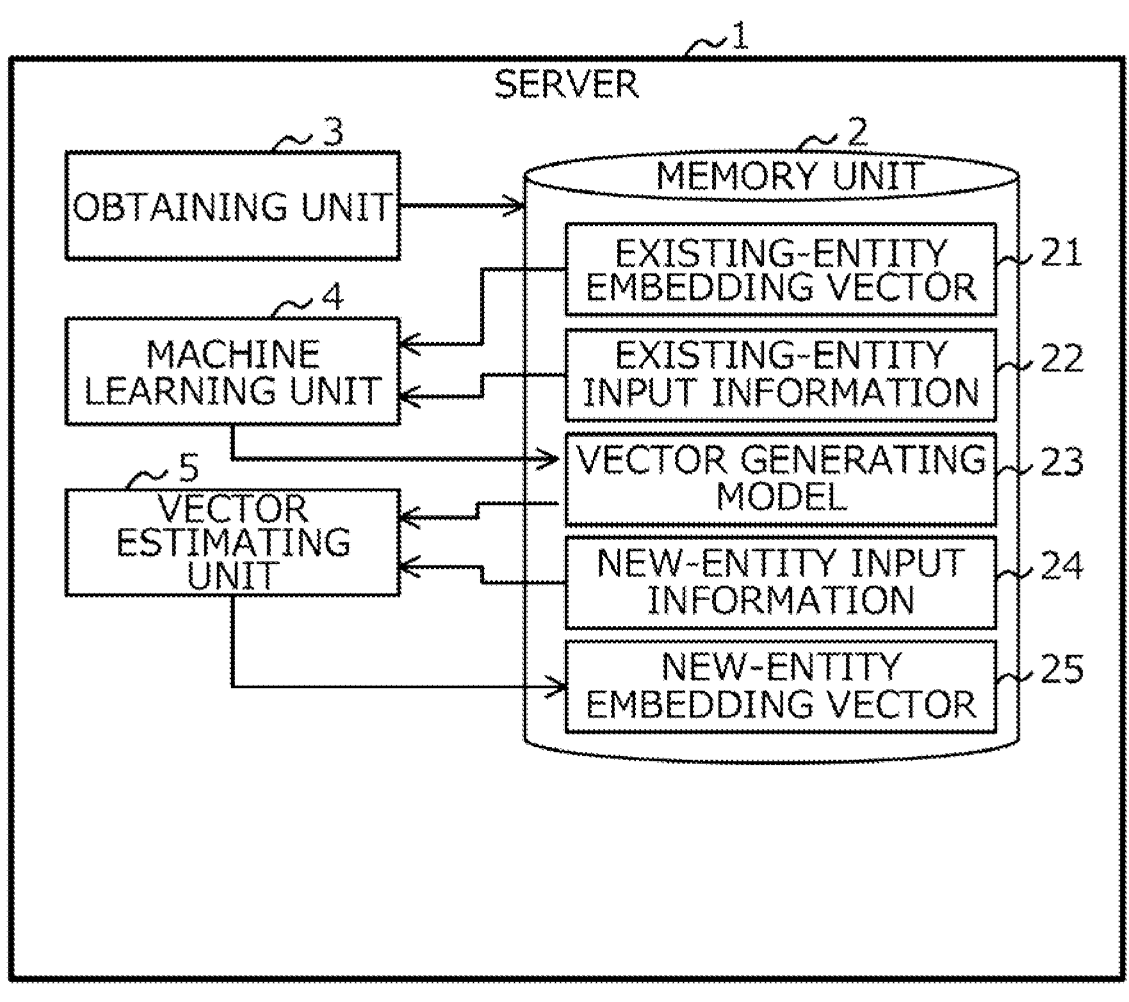
FIG. 6 is a block diagram illustrating an example of a functional configuration of the server of the one embodiment.

FIG. 6 is a block diagram schematically illustrating an example of a functional configuration of the server 1 according to the one embodiment. As illustrated in FIG. 6, the server 1 may illustratively include: a memory unit 2, an obtaining unit 3, a machine learning unit 4, and a vector estimating unit 5. The obtaining unit 3, the machine learning unit 4 and the vector estimating unit 5 are examples of a controlling unit.

The memory unit 2 is an example of a storing region, and stores various types of data that the server 1 uses. As illustrated in FIG. 6, the memory unit 2 may illustratively be capable of storing an existing-entity embedding vector 21, existing-entity input information 22, a vector generating model 23, a new-entity input information 24, and a new-entity embedding vector 25.

The obtaining unit 3 obtains the existing-entity embedding vector 21, the existing-entity input information 22 and the new-entity input information 24, and stores the obtained vector and information into the memory unit 2. For example, the obtaining unit 3 may obtain the existing-entity embedding vector 21 by using a machine-learned KG embedding model with reference to graph structure data representing a relationship of an entity group obtained by using entity information related to an existing entity group. The existing entity group illustrated in FIG. 5 is an example of the first entity group.

The entity information related to the existing entity group may be, for example, existing knowledge. The graph structure data may be, for example, data graphically expressing existing knowledge by a KG. The existing-entity embedding vector 21 may be, for example, embedding vector information for an existing KG, and is an example of the first vector 11 illustrated in FIG. 5. In addition, the machine-learned KG embedding model is an example of the first model 11*c* illustrated in FIG. 5.

As an alternative to the generation of the existing-entity embedding vector 21, the obtaining unit 3 may receive the existing-entity embedding vector 21 from the outside of the server 1 (e.g., computer) via a non-illustrated network and store the received existing-entity embedding vector 21 into the memory unit 2, for example.

The existing-entity input information 22 may be, for example, a feature value for an entity on the existing KG, and the new-entity input information 24 may be, for example, a feature value for a new (unknown) entity, in other words, an estimating target entity. The new entity illustrated in FIG. 5 of an estimating target is an example of the second entity 12*a*. Further, the existing-entity input information 22 is an example of the first entity information 11*b* illustrated in FIG. 5, and the existing-entity input information 22 and the new-entity input information 24 are examples of the second entity information 12 illustrated in FIG. 5.

The feature value may include, for example, a graph structure around a target node, which is exemplified by information on an entity (entity of a link destination) linked to a node (entity node) of the existing or estimating target entity. The feature value may also include a text of a label attached to each entity node, a title of and/or a category information of a web page, for example. The feature value as the new-entity input information 24 may be different from the feature value used in the machine-leaned KG embedding model.

In the machine learning phase, the machine learning unit 4 executes a machine learning process that performs machine learning of the vector generating model 23 for estimating the new-entity embedding vector 25 on the basis of the existing-entity embedding vector 21 and the existing-entity input information 22. The machine learning process is an example of the second model generating process P1 illustrated in FIG. 5. The vector generating model 23 is an example of the second model 13 illustrated in FIG. 5, and the new-entity embedding vector 25 is an example of the second vector 14 illustrated in FIG. 5.

For example, the machine learning unit 4 may perform machine learning of the vector generating model 23 for the entity on the existing KG so as to generate a vector close to the existing-entity embedding vector 21 from the feature value included in the existing-entity input information 22.

The following description assumes that the existing-entity input information 22 is the feature value including the page title of a web page and entities of link destinations.

Figure 7:
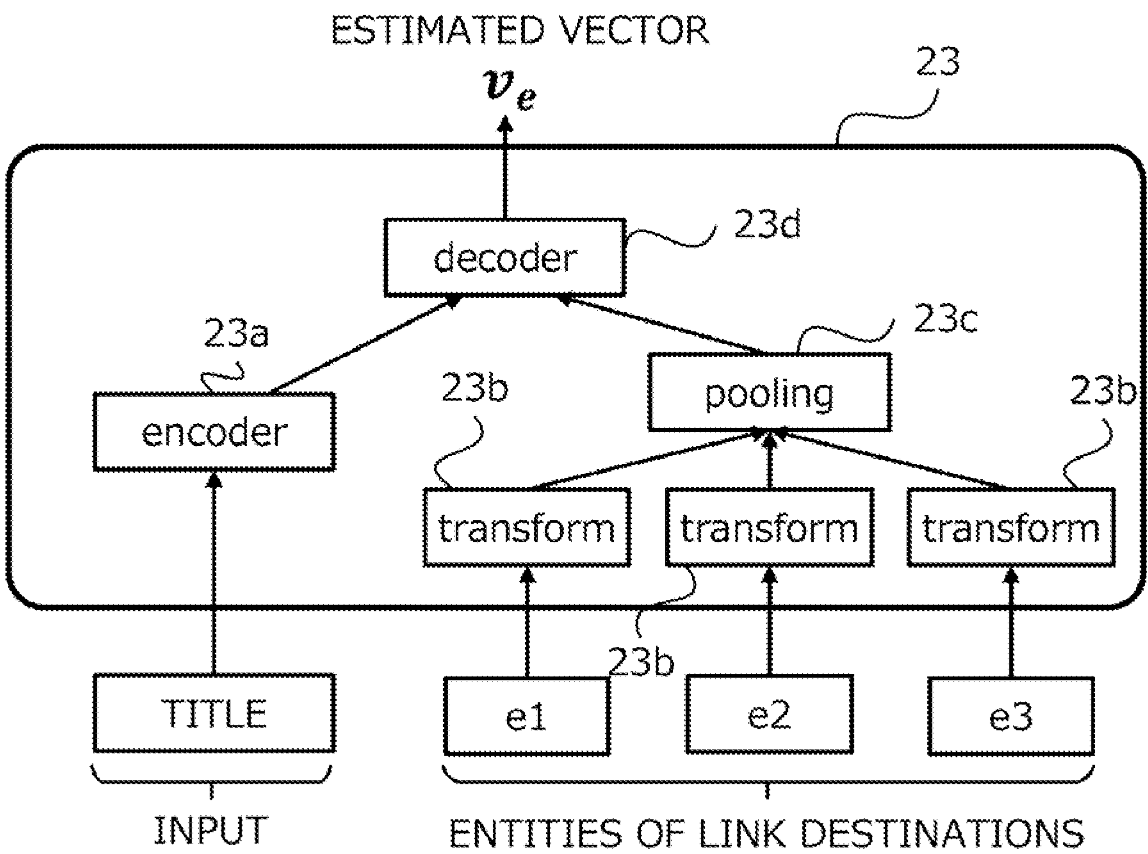
FIG. 7 is a diagram illustrating an example of parameters of a vector generating model.

FIG. 7 is a diagram illustrating an example of parameters of the vector generating model 23. As illustrated in FIG. 7, the parameters of the vector generating model 23 may illustratively include processing layers of an encoder 23*a*, multiple (three in the example of FIG. 7) transforms 23*b*, a pooling 23*c*, and a decoder 23*d*.

The encoder 23*a* encodes, as an input, a text of a page title (denoted as “title”) among the feature values of the existing-entity input information 22 and outputs the result of encoding to the decoder 23*d*.

The multiple transforms 23*b* are provided one for each of the entities (denoted as “e1”, “e2”, and “e3”) of the link destinations and convert the information on each of the entities of the link destinations.

The pooling 23*c* performs a convolution process on the outputs from the multiple transforms 23*b*.

The decoder 23*d* outputs an estimated vector ve based on the respective outputs from the encoder 23*a* and the pooling 23*c*. The estimated vector ve is an example of an estimated value of the embedding vector of the input existing entity.

The configuration of each processing layer of the vector generating model 23 is not limited to that illustrated in FIG. 7, and may be modified according to parameters serving as the feature values of the existing-entity input information 22.

The machine learning unit 4 may, for example, perform machine-learning of the vector generating model 23, e.g., updating of the parameters, such that the distance L between the existing-entity embedding vector 21 and the estimated vector ve outputted from the vector generating model 23 come closer to each other in distance L. The distance L may be calculated on the basis of, for example, the following equation (1).

$$L = \frac{1}{n}\sum_{e}(v_e - v_e^*)^2 \tag{1}$$

Here, in the above equation (1), the symbol n represents the total number of entities included in the learning data, and the symbol e represents the entity. The symbol ve represents the estimated vector ve outputted from the vector generating model 23, and the symbol ve* represents the existing-entity embedding vector 21.

As an example, in response to an input of a machine-learning instruction, the machine learning unit 4 inputs the existing-entity input information 22 into a neural network to obtain an output. Then the machine learning unit 4 updates the parameters such that the error between the existing-entity embedding vector 21 and the output value from the neural network becomes small according to the above equation (1).

The machine learning unit 4 terminates the machine learning when the machine learning has been executed a predetermined number of times or when the error becomes smaller than a predetermined value, and stores, as the vector generating model 23, various parameters and the like into the memory unit 2. To the machine learning method, various methods such as backpropagation can be adopted.

After the machine-learning of the vector generating model 23 by the machine learning unit 4, the vector estimating unit 5 executes the vector estimating process in the estimating phase in response to an input of a vector estimating instruction. The vector estimating process is an example of the second vector estimating process P2 illustrated in FIG. 5.

For example, the vector estimating unit 5 may input the new-entity input information 24 related to the estimating target entity into the machine-learned vector generating model 23, and may obtain and output the new-entity embedding vector 25 as an output.

The output of the new-entity embedding vector 25 includes, for example, storing into the memory unit 2 or a storage device, transmitting to the outside of the server 1 via a non-illustrated network, displaying on an output device such as a monitor, and the like.

The vector estimating unit 5 may merge the obtained new-entity embedding vector 25 with the existing-entity embedding vector 21, and manage the merged vector.

As the above, even if the use of the machine-learned KG embedding model based on the graph structure data representing the relationship of the existing entity group is restricted, the server 1 of the one embodiment can estimate the new-entity embedding vector 25.

Further, in training of the vector generating model 23, the server 1 can use various feature values as the existing-entity input information 22 in addition to the graph structure data representing the relationship of the existing entity group.

In addition, this eliminates the requirement for the server 1 to perform machine-learning on the entire updated KG all over again to obtain the new-entity embedding vector 25. In other words, since server 1 can use the existing-entity embedding vector 21 in place of using the machine-learned KG embedding models (machine re-learning), it is expected that the machine learning of the vector generating model 23 will converge earlier than a case where the machine re-learning is performed.

As described above, the server 1 trains the vector generating model 23 that directly estimates the new-entity embedding vector 25 on the basis of the feature value(s) common to the entities (nodes) on the existing KG and the estimating target entity. This makes it possible to use the output result of the vector generating model 23 serving as an input of the new-entity input information 24, as a substitute for the embedding vector related to the estimating target vector. Accordingly, the embedding vector related to the new entity can be efficiently calculated (obtained).

<1-3> Example of Operation

Hereinafter, an example of the operation of the server 1 described above will now be described with reference to flow diagrams.

<1-3-1> Machine Learning Process

Figure 8:
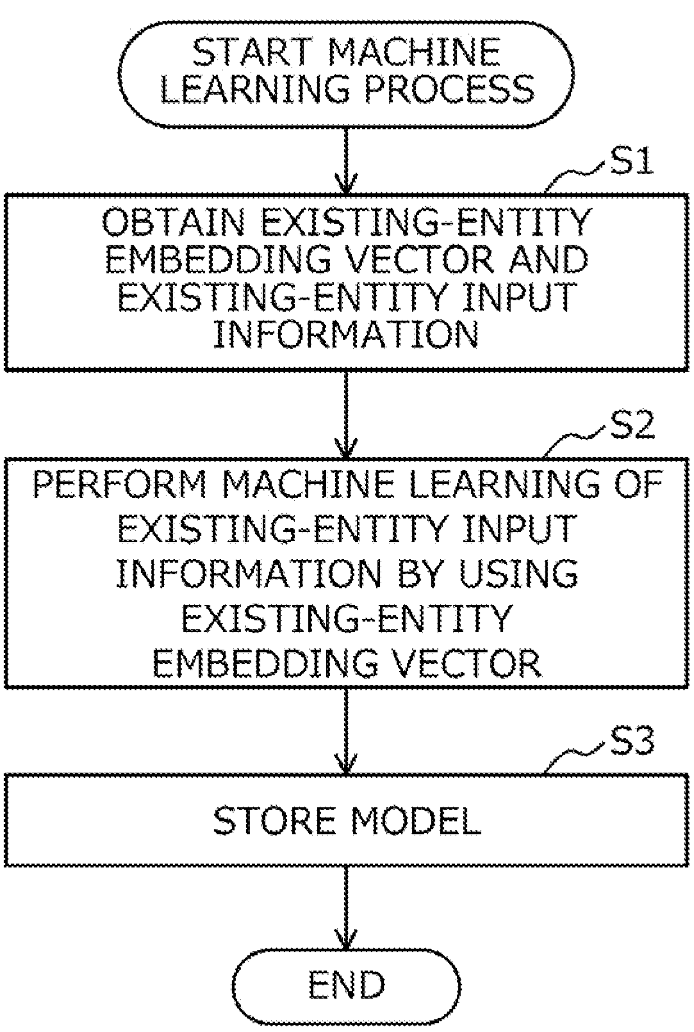
FIG. 8 is a flow diagram illustrating an example of operation of a machine learning process by the server of the one embodiment.

FIG. 8 is a flow diagram illustrating an example of the operation of the machine learning process of the server 1 according to the one embodiment.

As illustrated in FIG. 8, the obtaining unit 3 of the server 1 obtains the existing-entity embedding vector 21 and the existing-entity input information 22 (Step S1) and stores the obtained vector and information into the memory unit 2. For example, the obtaining unit 3 may generate the existing-entity embedding vector 21 by using the KG embedding model of existing entities and obtain the existing-entity input information 22 corresponding to the existing-entity embedding vector 21. Alternatively, the obtaining unit 3 may receive the existing-entity embedding vector 21 and the existing-entity input information 22 from a computer used by an operator or the like via a non-illustrated network.

When a machine learning instruction is inputted from, for example, the obtaining unit 3 or the operator (computer), the machine learning unit 4 refers to the memory unit 2 and performs machine learning of the existing-entity input information 22 on the basis of the existing-entity embedding vector 21 (Step S2). The machine learning unit 4 terminates the machine learning when, for example, the machine learning has been performed a predetermined number of times, or when the error between the existing-entity embedding vector 21 and the output value from the neural network becomes smaller than a predetermined value. Then, the machine learning unit 4 stores, as the vector generating model 23, the various parameters and the like into the memory unit 2 (Step S3), and the process ends.

<1-3-2> Vector Estimating Process

Figure 9:
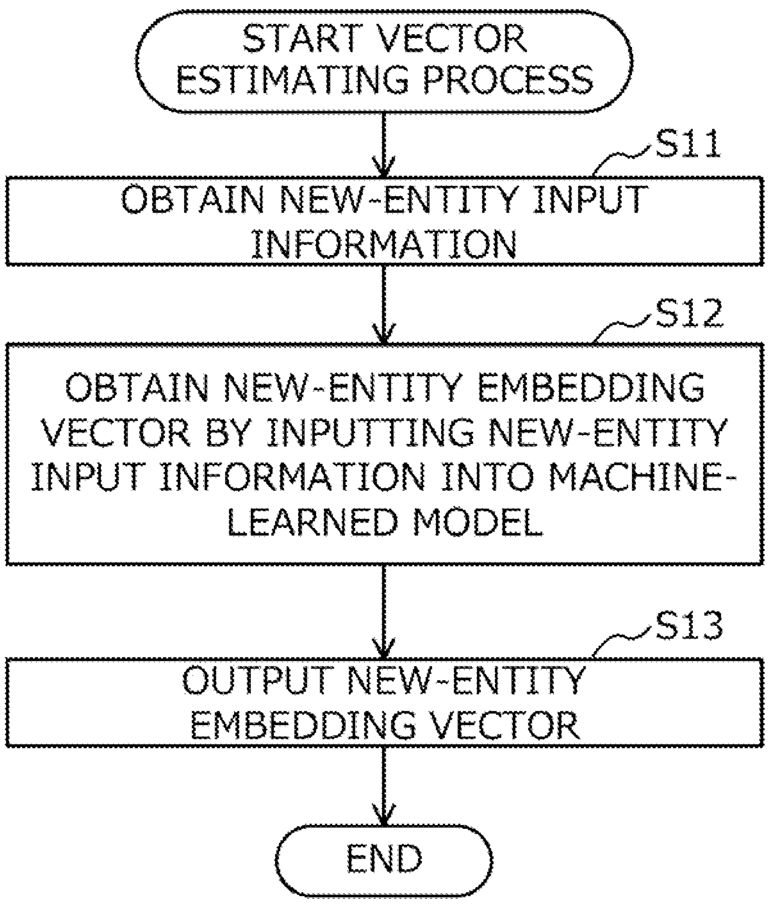
FIG. 9 is a flow diagram illustrating an example of operation of a vector estimating process by the server of the one embodiment.

FIG. 9 is a flow diagram illustrating an example of the operation of the vector estimating process of the server 1 according to the one embodiment.

As illustrated in FIG. 9, the obtaining unit 3 of the server 1 obtains the new-entity input information 24 (Step S11) and stores the obtained information into the memory unit 2. For example, the obtaining unit 3 may receive the new-entity input information 24 from a computer used by an operator or the like via a non-illustrated network.

When a vector estimating instruction is input from, for example, the obtaining unit 3 or an operator (computer), the vector estimating unit 5 refers to the memory unit 2 and inputs the new-entity input information 24 into the machine-learned vector generating model 23. Then, the vector estimating unit 5 obtains the new-entity embedding vector 25 as an output from the vector generating model 23 (Step S12). The vector estimating unit 5 outputs the new-entity embedding vector 25 (Step S13), and the process ends.

<1-4> Example of Hardware Configuration

The server 1 of the one embodiment may be a virtual server (VM; Virtual Machine) or a physical server. The function of the server 1 may be achieved by one computer or by two or more computers. Further, at least some of the functions of the server 1 may be implemented using Hardware (HW) resources and Network (NW) resources provided by cloud environment.

Figure 10:
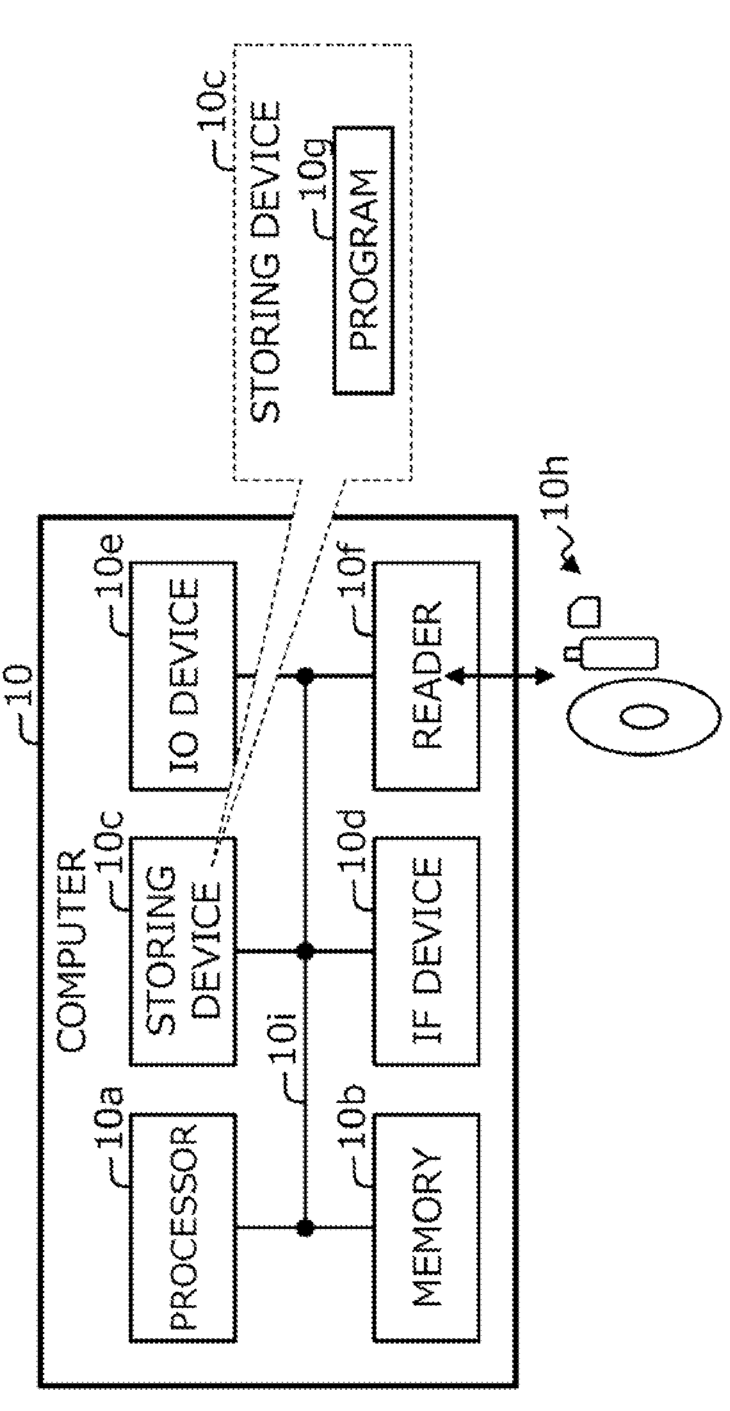
FIG. 10 is a block diagram illustrating an example of a hardware (HW) configuration of a computer according to the one embodiment.

FIG. 10 is a block diagram illustrating a hardware (HW) configuration of the computer 10 that achieves the functions of the server 1. If multiple computers are used as the HW resources for achieving the functions of the server 1, each of the computers may include the HW configuration illustrated in FIG. 10.

As illustrated in FIG. 10, the computer 10 may exemplarily include a processor 10*a*, a memory 10*b*, a storing device 10*c*, an IF (Interface) device 10*d*, an I/O (Input/Output) device 10*e*, and a reader 10*f* as the HW configuration.

The processor 10*a* is an example of an arithmetic processing apparatus that performs various controls and arithmetic operations. The processor 10*a* may be connected to each block in the computer 10 so as to be mutually communicable via a bus 10*i*. The processor 10*a* may be a multiprocessor including multiple processors. The processor 10*a* may be a multi-core processor including multiple processor cores. The computer 10 may have a configuration having multiple multi-core processors.

An example of the processor 10*a* is an Integrated Circuit (IC) such as a Central Processing Unit (CPU), a Micro Processing Unit (MPU), a Graphics Processing Unit (GPU), an Accelerated Processing Unit (APU), a Digital Signal Processor (DSP), an Application Specific IC (ASIC), and a Field-Programmable Gate Array (FPGA). Alternatively, the processor 10*a* may be a combination of two or more ICs exemplified as the above.

The memory 10*b* is an example of a HW device that stores information such as various data and programs. An example of the memory 10*b* includes one or both of a volatile memory such as a Dynamic Random Access Memory (DRAM) and a non-volatile memory such as a Persistent Memory (PM).

The storing device 10*c* is an example of a HW device that stores information such as various data and programs. Examples of the storing device 10*c* include various storing devices exemplified by a magnetic disk device such as a Hard Disk Drive (HDD), a semiconductor drive device such as a Solid State Drive (SSD), and a non-volatile memory. Examples of a non-volatile memory are a flash memory, a Storage Class Memory (SCM), and a Read Only Memory (ROM).

The storing device 10*c* may store a program log (vector estimating program) that achieves all or part of the functions of the computer 10.

For example, the processor 10*a* of the server 1 expands the program log stored in the storing device 10*c* onto the memory 10*b* and executes the expanded program 10*g*, so that the function as the server 1 (e.g., the obtaining unit 3, the machine learning unit 4, and the vector estimating unit 5) illustrated in FIG. 6 can be achieved. The memory unit 2 illustrated in FIG. 6 may be achieved by a storing region that at least one of the memory 10*b* and the storing device 10*c* has. Further, the vector estimating unit 5 illustrated in FIG. 6 may output and store the new-entity embedding vector 25 to and into at least one of the memory 10*b* and the storing device 10*c* serving as examples of the storage device.

The IF device 10*d* is an example of a communication IF that controls connection to and communication with a network between the computer 10 and another apparatus. For example, the IF device 10*d* may include an adaptor compatible with a Local Area Network (LAN) such as Ethernet (registered trademark), an optical communication such as Fibre Channel (FC), or the like. The adaptor may be compatible with one or both of wired and wireless communication schemes. For example, the server 1 may be communicably connected to a non-illustrated computer via the IF device 10*d*. At least some functions of the obtaining unit 3 illustrated in FIG. 6 may be implemented by the IF device 10*d*. Further, the program 10*g* may be downloaded from a network to the computer 10 through the communication IF and then stored into the storing device 10*c*, for example.

The I/O device 10*e* may include one or both of an input device and an output device. Examples of the input device are a keyboard, a mouse, and a touch screen. Examples of the output device are a monitor, a projector, and a printer. For example, the vector estimating unit 5 illustrated in FIG. 6 may output the new-entity embedding vector 25 to the output device of the IO device 10*e* and display the new-entity embedding vector 25 on the output device.

The reader 10*f* is an example of a reader that reads information on data and programs recorded on a recording medium 10*h*. The reader 10*f* may include a connecting terminal or a device to which the recording medium 10*h* can be connected or inserted. Examples of the reader 10*f* include an adapter conforming to, for example, Universal Serial Bus (USE), a drive apparatus that accesses a recording disk, and a card reader that accesses a flash memory such as an SD card. The program 10*g* may be stored in the recording medium 10*h*. The reader 10*f* may read the program log from the recording medium 10*h* and store the read program 10*g* into the storing device 10*c*.

An example of the recording medium 10*h* is a non-transitory computer-readable recording medium such as a magnetic/optical disk and a flash memory. Examples of the magnetic/optical disk include a flexible disk, a Compact Disc (CD), a Digital Versatile Disc (DVD), a Blu-ray disk, and a Holographic Versatile Disc (HVD). An example of the flash memory includes a semiconductor memory such as a USB memory and an SD card.

The HW configuration of the computer 10 described above is merely illustrative. Accordingly, the computer 10 may appropriately undergo increase or decrease of HW (e.g., addition or deletion of arbitrary blocks), division, integration in an arbitrary combination, and addition or deletion of the bus. For example, at least one of the I/o device 10*e* and the reader 10*f* may be omitted in the server 1.

<2> Miscellaneous

The technique according to the one embodiment described above can be implemented by changing or modifying as follows.

For example, the obtaining unit 3, the machine learning unit 4, and the vector estimating unit 5 included in the server 1 illustrated in FIG. 6 may be merged or may each be divided.

The server 1 illustrated in FIG. 6 may have a configuration in which each processing function is achieved by mutual cooperation of multiple apparatuses via a network. As an example, the obtaining unit 3 may be a web server and an application server, the machine learning unit 4 and the vector estimating unit 5 may be an application server, the memory unit 2 may be a DB server, and so on. In this case, each processing function as the server 1 may be achieved by the web server, the application server, and the DB server cooperating with one another via a network.

The method according to the one embodiment may be used in the following situations, for example.

Application Example 1

Application example 1 is a case where a machine-learned KG embedding vector disclosed to the public is applied to data including a new entity. The server 1 can estimate a vector corresponding to the new entity even if a model corresponding to the machine-learned KG embedding vector is not disclosed.

Application Example 2

Application example 2 is a case where machine learning of static KG embedding is performed and then put into practice for a large-scale KG. In this case, it is difficult to perform the machine re-learning of the KG each time the KG is updated in terms of cost. The server 1 can reduce the costs for machine re-learning of the entire KG by training the vector generating model 23 for an unknown vector, using a part of the machine-learned KG embedding vector in the method according to the one embodiment. For the machine-learned KG embedding vector in an existing model, a high-quality vector based on the existing model (original model) can be used without any modification.

In one aspect, the embodiment discussed above can estimate a vector corresponding to a second entity from a vector generated by using a model with reference to graph structure data that represents a relationship of a first entity group.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a vector estimating program that causes a computer to execute a process comprising:

obtaining a first vector and second entity information, the first vector being generated by using a first model with reference to graph structure data, the graph structure data representing a relationship of a first entity group and being obtained by using first entity information related to the first entity group, the second entity information being obtained by updating the first entity information and being related to the first entity group and a second entity not being included in the first entity group;

generating a second model based on the first vector and a feature value of the first entity group included in the second entity information, the second model being used for obtaining vector data from the second entity information; and outputting, as an estimated value of a second vector corresponding to the second entity, a result output from the second model by inputting a feature value of the second entity included in the second entity information into the generated second model, wherein the second model outputs the estimated value without the first model re-learning an entire knowledge graph based on both the updated first entity information and the second entity information, and the feature value of the second entity includes at least one of a graph structure around a target node and a text label on nodes within the second entity information.

2. The non-transitory computer-readable recording medium according to claim 1, wherein the generating of the second model comprises terminating machine learning of the second model when a number of times of performing the machine learning becomes a given number of times or when an error between a vector and the first vector becomes smaller than a given value, the vector being output from the second model when the feature value of the first entity group included in the second entity information is used as an input.

3. The non-transitory computer-readable recording medium according to claim 1, wherein the generating of the second model comprises generating the second model based on one or more feature values common to the first entity group and the second entity, the second model being used for estimating the second vector.

4. An apparatus for estimating a vector, the apparatus comprising:

a memory; and a processor coupled to the memory, the processor being configured to obtain a first vector and second entity information, the first vector being generated by using a first model with reference to graph structure data, the graph structure data representing a relationship of a first entity group and being obtained by using first entity information related to the first entity group, the second entity information being obtained by updating the first entity information and being related to the first entity group and a second entity not being included in the first entity group;

generate a second model based on the first vector and a feature value of the first entity group included in the second entity information, the second model being used for obtaining vector data from the second entity information; and output, as an estimated value of a second vector corresponding to the second entity, a result output from the second model by inputting a feature value of the second entity included in the second entity information into the generated second model, wherein the second model outputs the estimated value without the first model re-learning an entire knowledge graph based on both the updated first entity information and the second entity information, and the feature value of the second entity includes at least one of a graph structure around a target node and a text label on nodes within the second entity information.

5. The apparatus according to claim 4, wherein the processor terminates machine learning of the second model when a number of times of performing the machine learning becomes a given number of times or when an error between a vector and the first vector becomes smaller than a given value in the generating of the second model, the vector being output from the second model when the feature value of the first entity group included in the second entity information is used as an input.

6. The apparatus according to claim 4, wherein the processor generates the second model based on one or more feature values common to the first entity group and the second entity in the generating of the second model, the second model being used for estimating the second vector.

7. A computer-implemented method for estimating a vector, the method comprising:

obtaining a first vector and second entity information, the first vector being generated by using a first model with reference to graph structure data, the graph structure data representing a relationship of a first entity group and being obtained by using first entity information related to the first entity group, the second entity information being obtained by updating the first entity information and being related to the first entity group and a second entity not being included in the first entity group;

generating a second model based on the first vector and a feature value of the first entity group included in the second entity information, the second model being used for obtaining vector data from the second entity information; and outputting, as an estimated value of a second vector corresponding to the second entity, a result output from the second model by inputting a feature value of the second entity included in the second entity information into the generated second model, wherein the second model outputs the estimated value without the first model re-learning an entire knowledge graph based on both the updated first entity information and the second entity information, and the feature value of the second entity includes at least one of a graph structure around a target node and a text label on nodes within the second entity information.

8. The computer-implemented method according to claim 7, wherein the generating of the second model comprises terminating machine learning of the second model when a number of times of performing the machine learning becomes a given number of times or when an error between a vector and the first vector becomes smaller than a given value, the vector being output from the second model when the feature value of the first entity group included in the second entity information is used as an input.

9. The computer-implemented method according to claim 7, wherein the generating of the second model comprises generating the second model based on one or more feature values common to the first entity group and the second entity, the second model being used for estimating the second vector.

* * * * *